United States Patent
Kohno et al.

(10) Patent No.: US 7,661,303 B2
(45) Date of Patent: Feb. 16, 2010

(54) FLOW MEASURING DEVICE HAVING HEATING RESISTOR IN INCLINED POSITION WITH RESPECT TO THE FLOW DIRECTION

(75) Inventors: Yasushi Kohno, Obu (JP); Takao Ban, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/078,110

(22) Filed: Mar. 27, 2008

(65) Prior Publication Data

US 2008/0236274 A1    Oct. 2, 2008

(30) Foreign Application Priority Data

Mar. 29, 2007    (JP) .............................. 2007-088604

(51) Int. Cl.
    *G01F 1/68* (2006.01)
(52) U.S. Cl. .................................... 73/202.5
(58) Field of Classification Search ............... 73/202.5, 73/204.26, 204.27
    See application file for complete search history.

(56) References Cited

U.S. PATENT DOCUMENTS 5,086,650 A * 2/1992 Harrington et al. ....... 73/204.21
5,520,047 A * 5/1996 Takahashi et al. ........ 73/204.26
5,780,735 A * 7/1998 Kadohiro et al. ........... 73/202.5
6,253,606 B1 * 7/2001 Yonezawa et al. ........ 73/204.26
6,679,114 B2 * 1/2004 Yamakawa ............... 73/204.26
6,820,479 B2 * 11/2004 Roeckel et al. ............. 73/202.5
7,043,978 B2 * 5/2006 Goka et al. ................ 73/202.5

FOREIGN PATENT DOCUMENTS

| EP | 69253 A1 | * 1/1983 |
| JP | 59-190623 | 10/1984 |
| JP | 59-190624 | 10/1984 |
| JP | 08-105778 | 4/1996 |
| JP | 2007-113978 | 5/2007 |

* cited by examiner

*Primary Examiner*—Harshad Patel
(74) *Attorney, Agent, or Firm*—Nixon & Vanderhye, P.C.

(57) ABSTRACT

An airflow measuring device includes a sensing portion provided in a bypass passage, which perpendicularly deflects part of air from a main passage to therethrough bypass the part of air. The sensing portion includes a heating resistor energized and dissipate heat to airflow. The sensing portion is configured to measure airflow in the bypass passage based on the heat radiation. The sensing portion further includes a pair of support members erected in the bypass passage to support the heating resistor. The heating resistor of the sensing portion is inclined at a first inclination angle with respect to a direction, which is perpendicular to a flow direction of air in the bypass passage. The heating resistor is inclined toward downstream at an outer streamline of the airflow in the bypass passage.

14 Claims, 7 Drawing Sheets

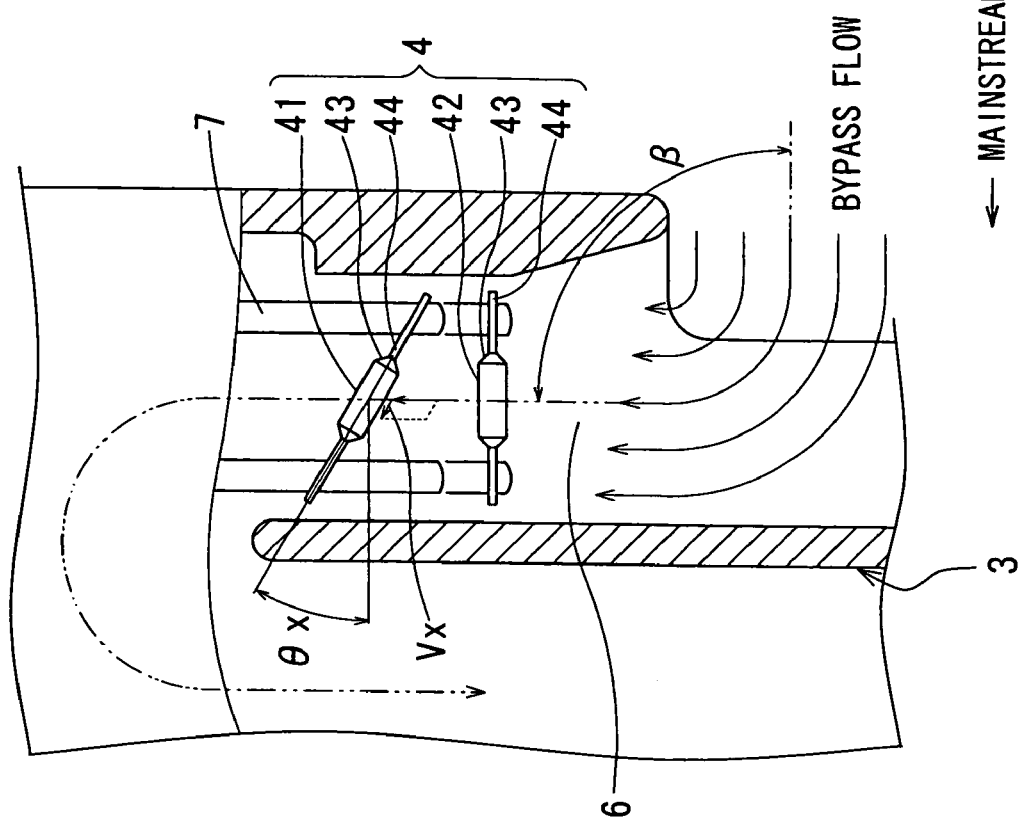
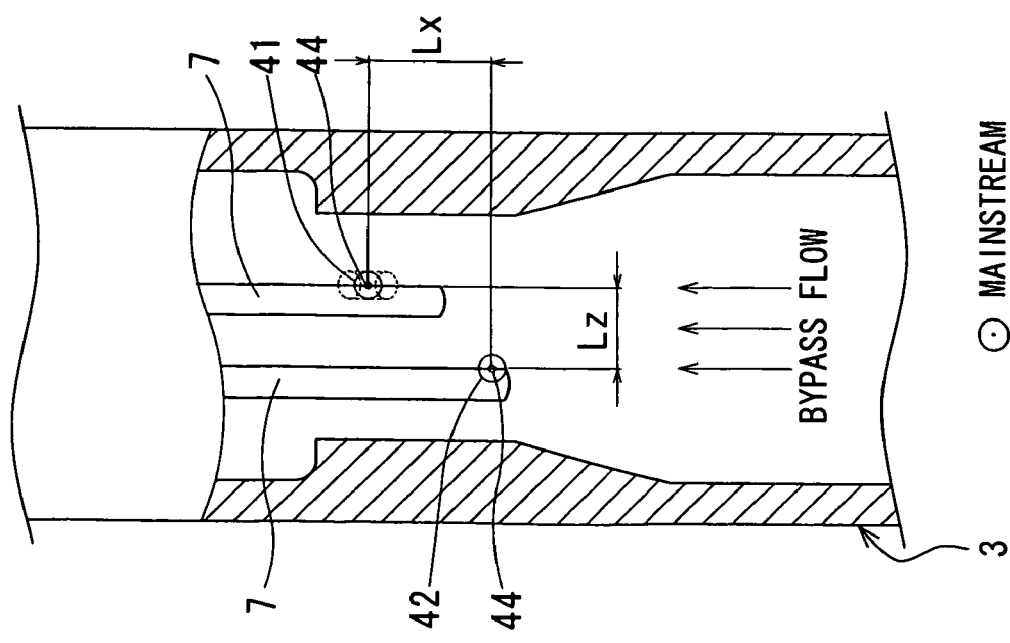

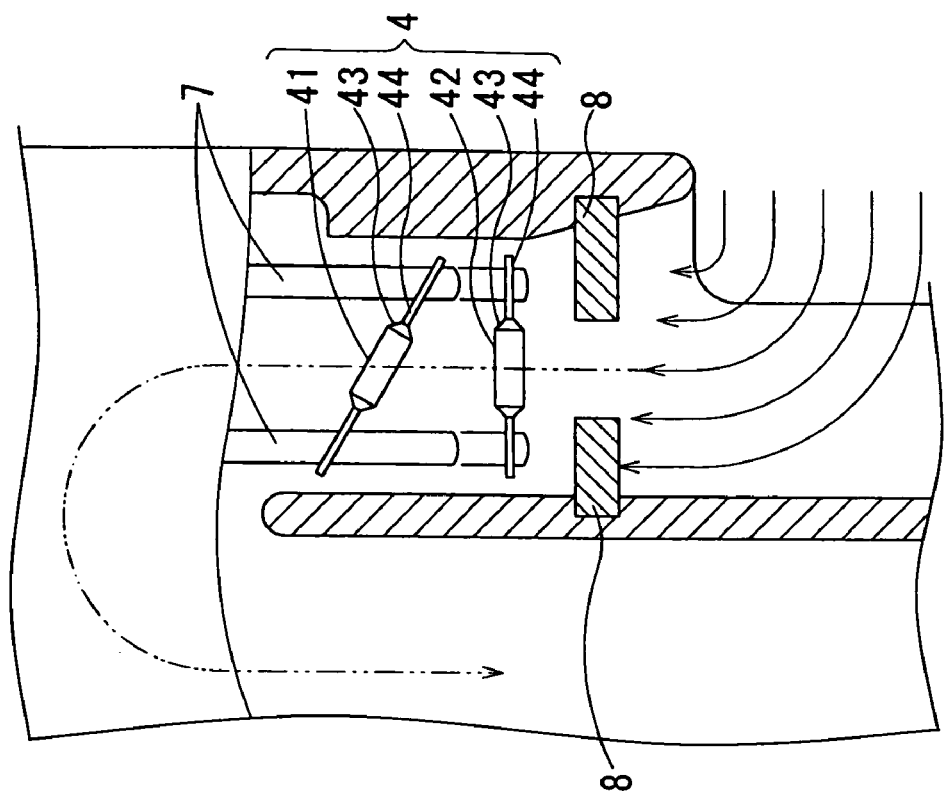
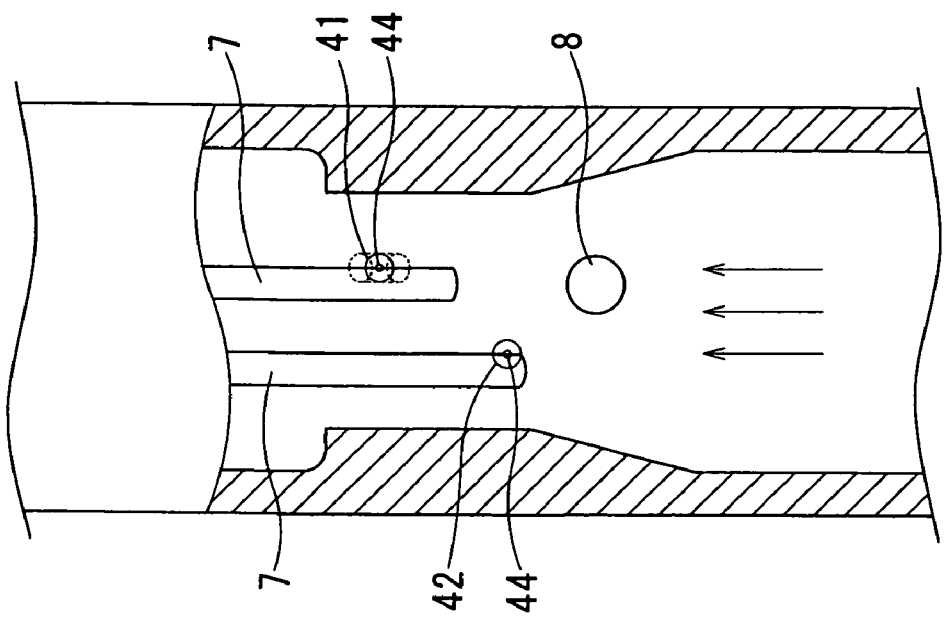

FLOW MEASURING DEVICE HAVING HEATING RESISTOR IN INCLINED POSITION WITH RESPECT TO THE FLOW DIRECTION

CROSS REFERENCE TO RELATED APPLICATIONS

This application is based on and incorporates herein by reference Japanese Patent Application No. 2007-88604 filed on Mar. 29, 2007.

FIELD OF THE INVENTION

The present invention relates to a flow measuring device.

BACKGROUND OF THE INVENTION

Conventionally, a thermal flow measuring device is employed for measuring intake airflow of an internal combustion engine of a vehicle. A thermal flow measuring device includes a heating resistor and measures airflow in accordance with heat radiation from the heating resistor to the airflow. The heating resistor is constructed by winding a metallic resistive element around a bobbin in a cylindrical shape, and connecting both ends of the resistive element to a pair of lead members. The metallic resistive element is, for example, a platinum thin wire having a large temperature coefficient of resistance. The heating element is coated with a protective film at the surface and an end portion.

Heat dissipated from the heating resistor to airflow is substantially in proportion to the square root of velocity of the airflow and a temperature difference between the surface of the heating resistor and the airflow. The heating resistor and temperature compensating resistive element are combined to construct a resistance bridged circuit. The temperature compensating resistive element is configured to detect temperature of the airflow. As the heating resistor dissipates heat, resistance of the heating resistor changes. An electric current is supplied to the resistance bridged circuit, and the electric current is controlled such that temperature difference between the heating resistor and the temperature compensating resistive element is regularly maintained at a predetermined value. The velocity of the airflow is detected based on the electric current, and the amount of intake air, i.e., air mass flow is measured based on the flow velocity.

In the present structure, when a balanced condition of the resistance bridged circuit changes due to variation in temperature, the change in the balanced conditions can be compensated by the temperature compensating resistive element. However, suspended particulates such as dust are contained in intake air of the internal combustion engine, and such suspended particulates may adhere to the surface of the heating resistor and the lead members. Such adhesion changes a heat radiation characteristic of the heating resistor and a thermal property of the lead member. As a result, an output characteristic such as response of the thermal flow measuring device may be impaired.

In general, the heating resistor is maintained at high temperature, for example, 200° C. Therefore, even when water, which is contained in suspended particulates, adheres to the heating resistor, the water may be evaporated. However, oil contained in suspended particulates may adhere to the heating resistor and remain, even low-boiling-point components of the oil is partially evaporated on the heating resistor. Thus, the surface of the heating resistor may be contaminated by suspended particulates containing oil.

A conventional airflow measuring device has a structure configured to protect the lead member, the heating resistor, and a support member, which supports the heating resistor, from adhesion of suspended particulate as contamination substance contained in airflow.

JP-A-59-190623 proposes a thermal airflow measuring device including heating resistive elements for measuring air mass flow and temperature compensation, and the heating resistive elements are located along airflow in a bypass passage. The bypass passage leads part of airflow from a main passage. The heating resistive elements are inclined with respect to the airflow at an angle preferably less than 90°. In the present structure, the heating resistor for measuring airflow can be elongated with respect to the direction of the airflow in the bypass passage, which is limited in diameter, and whereby enhanced in response.

In the present structure, the heating resistive element and the lead member are inclined against the airflow in some degree, so that part of laminar flow in the airflow is easily shifted to turbulent flow on the surface of the heating resistor. Therefore, a heat transfer characteristic as a heat transfer coefficient is enhanced, so that output response may be improved. However, the airflow is added with a vertical component directed to the surface of the heating resistor, and consequently stagnation is apt to arise in the airflow. Thus, suspended particulates are apt to adhere to the heating resistor, the lead members, and support members that are located perpendicularly to the flow direction.

JP-A-59-190624 proposes a thermal airflow measuring device including a protection member provided upstream of the heating resistor for reducing adhesion of suspended particulates. In the present structure, adhesion of suspended particulates can be suppressed, so that the output characteristic can be maintained.

However, airflow may become unstable due to the protection member, and consequently airflow cannot be accurately measured.

JP-A-8-105778 proposes a thermal airflow measuring device including a heating resistor, which has a relatively large temperature coefficient of resistance. The heating resistor is located in a fluid passage and connected to a bridged circuit. The heating resistor is formed with a cylindrical bobbin having a center axis, which is perpendicular to the airflow. A pair of lead members connects both ends of the heating resistor with a pair of terminals, which is erected in the passage. Each lead member protrudes from each end surface of the bobbin to be in parallel with the center axis of the bobbin. A protection member is provided upstream of each lead member with respect to streamlines of the fluid. The protection member is located in parallel with the lead member so as not to disturb the fluid flow.

The size of the protection member is determined correspondingly to the size of the lead member, whereby adhesion of suspended particulates to the lead member can be suppressed. Consequently, measurement accuracy and a response characteristic can be maintained.

In the present structure, contamination of the surface of the lead member can be suppressed. However, contamination of the heating resistor as an essential component may not be effectively suppressed. The particulates adhered to the surface of the heating resistor may be partially burned or evaporated by heat of the heating resistor. However, suspended particulates, which contain oil, may not be removed and accumulate on the heating resistor.

In reality, intake air contains various kinds of suspended particulates such as very minute particulates, which are significantly light and easily scattered, relatively large and heavy particulates, which are applied with inertia and apt to collide against the surface, moisture, and oil. Such suspended particulates as contamination substance may exist in stagnation and adhere to the heating resistor, the lead member of the heating resistor, and the support member. As a result, the heat radiation characteristic changes, and the output characteristic such as response is impaired.

The above conventional structures are not sufficient to reduce adhesion. Therefore, accuracy in output characteristic such as response of the detection of the airflow may be impaired.

SUMMARY OF THE INVENTION

In view of the foregoing and other problems, it is an object of the present invention to produce an airflow measuring device having a sensing portion, which is capable of accurately detecting airflow and restricted from adhesion of particulates.

According to one aspect of the present invention, an airflow measuring device provided to a main passage, the airflow measuring device comprises a bypass passage configured to perpendicularly deflect part of air from the main passage to therethrough bypass the part of air. The airflow measuring device further comprises a sensing portion provided in the bypass passage. The sensing portion includes a heating resistor configured to be energized and dissipate heat to airflow, the sensing portion being configured to measure airflow in the bypass passage based on the heat radiation. The sensing portion further includes a pair of support members erected in the bypass passage to support the heating resistor. The heating resistor of the sensing portion is inclined at a first inclination angle with respect to a direction, which is perpendicular to a flow direction of air in the bypass passage. The heating resistor is inclined toward downstream at an outer streamline of the airflow in the bypass passage.

BRIEF DESCRIPTION OF THE DRAWINGS

The above and other objects, features and advantages of the present invention will become more apparent from the following detailed description made with reference to the accompanying drawings. In the drawings:

FIG. 2A is a partially sectional lateral view showing a sensing portion of the airflow measuring device according to the first embodiment, and FIG. 2B is a partially sectional front view showing the sensing portion;

FIG. 8A is a partially sectional lateral view showing a sensing portion of an airflow measuring device according to a modification of the second embodiment, and FIG. 8B is a partially sectional front view showing the sensing portion.

DETAILED DESCRIPTION OF PREFERRED EMBODIMENTS

First Embodiment

Figure 3:
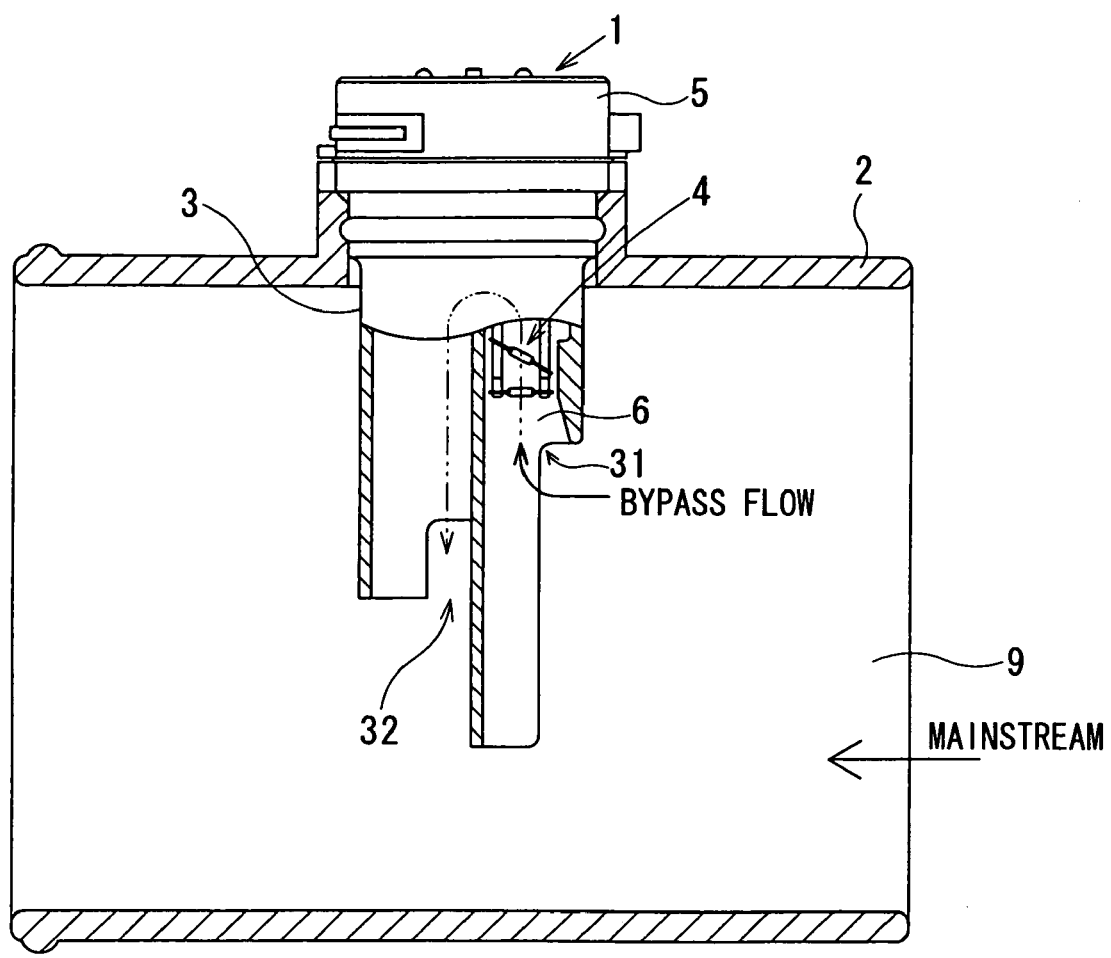
FIG. 3 is a partially sectional view showing the flow measuring device mounted to an air intake pipe.

As follows, a construction of an airflow measuring device is described with reference to FIGS. 1 to 3. In the present embodiment, as shown in FIG. 3, an airflow measuring device 1 is provided to, for example, an air intake pipe 2 of an internal combustion engine such as an automotive engine for measuring quantity of intake air drawn into the engine. More specifically, the airflow measuring device 1 is mounted detachably to the intake pipe 2, which defines an air intake passage and communicates with an air cleaner (not shown). The connection between the airflow measuring device 1 and the intake pipe 2 constructs a plug-in system (plug-in structure).

Figure 1A:
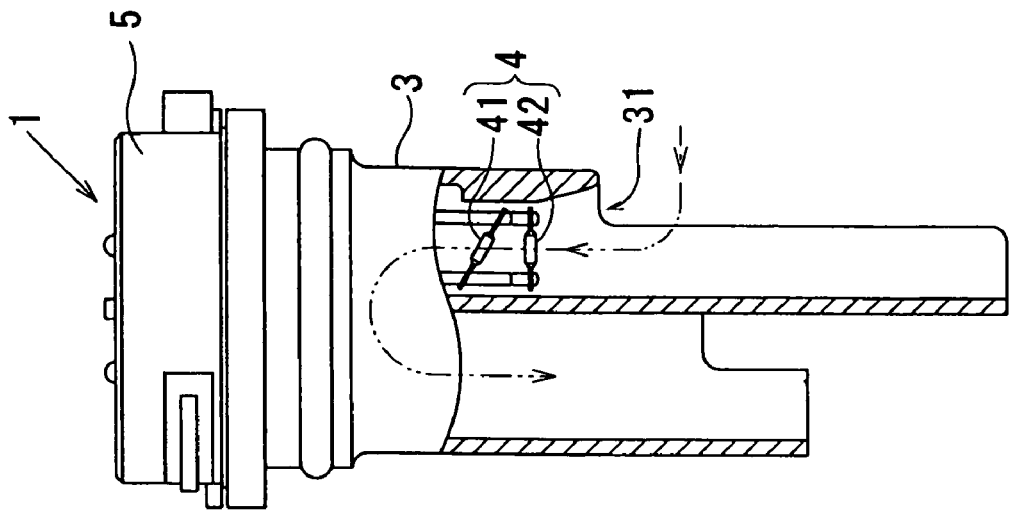
FIG. 1A is a partially sectional lateral view showing an airflow measuring device according to a first embodiment.

As shown in FIG. 1, the airflow measuring device 1 is constructed of a sensor body 3, a sensing portion 4, a circuit portion 5, and the like. Referring to FIG. 3, the sensor body 3 is inserted into the intake pipe 2 through a mount hole provided to a wall portion of the intake pipe 2. The intake pipe 2 defines a main passage 9. The sensor body 3 is arranged substantially perpendicular to a center axis of the intake pipe 2. The sensor body 3 therein defines a bypass passage 6 for forming a bypass flow shown by a double-dashed arrow in FIG. 3 to bypass a part of mainstream of airflow. The mainstream of airflow passes through the main passage 9 of the intake pipe 2. In the present structure, the mainstream of airflow is partially deflected substantially at 90° to form the bypass flow, and the bypass flow enters the bypass passage 6 through an inlet 31. Thereafter, the bypass flow is changed by 180° in flow direction to U-turn in the bypass passage 6, and the bypass flow leaves the sensor body 3 through an outlet 32.

Figure 1B:
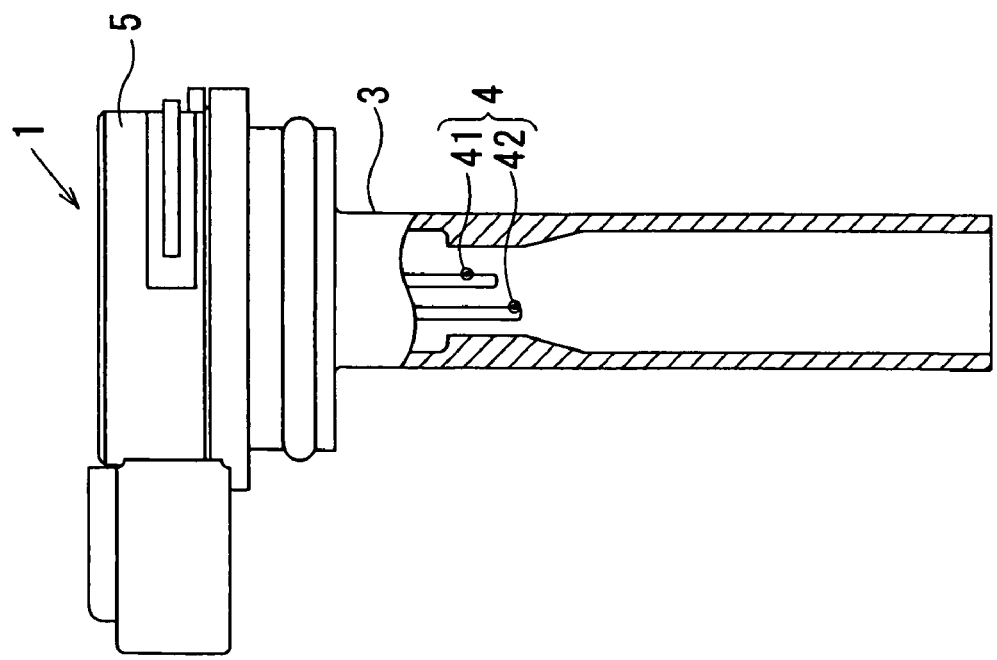
FIG. 1B is a partially sectional front view showing the airflow measuring device.

The sensing portion 4 includes a heating resistor 41 and a temperature-sensitive resistor 42. The heating resistor 41 is provided for detecting the amount of intake air flowing through the bypass passage 6. The temperature-sensitive resistor 42 is provided for detecting air temperature in the bypass passage 6. As shown in FIG. 1B, the sensing portion 4 is located upstream of a U-turn portion of the bypass passage 6 and downstream of the inlet 31, which deflects the bypass flow substantially at 90°.

As shown in FIGS. 2A, 2B, the heating resistor 41 is constructed by wiring a platinum wire around an outer periphery of a bobbin 43. The platinum wire is, for example, 0.02 mm in diameter. Both ends of the platinum wire are connected with a pair of lead members 44, which are provided to both ends of the bobbin 43. The heating resistor 41 and the lead member 44 are at least partially covered with a protective coat. Similarly to the heating resistor 41, the temperature-sensitive resistor 42 is constructed by wiring a platinum wire around an outer periphery of the bobbin 43. Both ends of the platinum wire are connected with a pair of lead members 44, which are provided to both ends of the bobbin 43. The heating resistor 41 and the lead members 44 are covered with a protective coat.

Each of the bobbins 43 is formed of an electrically insulative material such as aluminum oxide to be substantially in a cylindrical shape. For example, each of the lead members 44 is formed of platinum to be substantially in a wire-shape or a bar-shape. The lead member 44 has one end that is inserted into an inner circumferential periphery of the bobbin 43 and fixed with glue such as high-melting point glass. The lead member 44 has the other end that is fixed to a support member 7 by welding or the like.

The circuit portion 5 has a foundation wall located on an end of the sensor body 3. The support member 7 is elected from the foundation wall of the circuit portion 5 substantially along a direction of the bypass flow in the bypass passage. The support member 7 extends in a longitudinal direction, which substantially coincides with a direction of a streamline of the bypass flow. The support member 7 also serves as a terminal for electrically conducting a circuit board (not shown), which is housed in the circuit portion 5, with the lead member 44. The support member 7 is an electrically conductive member being circular, rectangle, or the like in cross section. For example, the protective coat is formed by sintering a glass-coating film, which includes lead oxide, at around 800° C.

As shown in FIG. 2A, the heating resistor 41 and the temperature-sensitive resistor 42 are distant from each other. Specifically, the heating resistor 41 is at a predetermined distance Lx from the temperature-sensitive resistor 42 with respect to the vertical direction in FIG. 2A, the bypass flow being deflected substantially at 90° from the mainstream and oriented substantially at the vertical direction in FIG. 2A. Similarly, the heating resistor 41 is at a predetermined distance Lz from the temperature-sensitive resistor 42 with respect to the horizontal direction in FIG. 2A, the horizontal direction being perpendicular to the direction of the bypass flow being deflected from the mainstream. The temperature-sensitive resistor 42 is located upstream of the heating resistor 41. The temperature-sensitive resistor 42 is electrically connected with the circuit board, which is housed in the circuit portion 5, via the support members 7, which are respectively connected with the lead members 44. In the present embodiment, the temperature-sensitive resistor 42 is located upstream of the heating resistor 41. However, the physical relationship between the temperature-sensitive resistor 42 and the heating resistor 41 is not limited to that in FIG. 2A. That is, the heating resistor 41 may be located upstream of the temperature-sensitive resistor 42.

Referring to FIG. 3, the circuit portion 5 is provided to the end of the sensor body 3 and located outside the mount hole of the intake pipe 2. The circuit portion 5 has, for example, a resistance bridge circuit to control electricity supplied to the heating resistor 41 such that difference between temperature of the heating resistor 41 and air temperature detected using the temperature-sensitive resistor 42 is regularly maintained at a constant value. The circuit portion 5 outputs an electric signal to an external electronic control unit (ECU) correspondingly to the electricity supplied to the heating resistor 41. The ECU obtains the intake amount in accordance with the electric signal output from the circuit portion 5.

In the present embodiment, as shown in FIG. 2B, the heating resistor 41 is inclined at a predetermined angle θx toward the downstream of an outer streamline of flux of the bypass flow, which is branched from the mainstream and deflected at substantially 90°, in order to enhance detection accuracy of airflow and restrict adhesion of particulates suspended in airflow.

As shown in FIGS. 2A, 2B, the sensing portion 4 is arranged in the bypass passage 6. Specifically, the heating resistor 41 is inclined by angle θx with respect to a direction perpendicular to the streamline of the bypass flow in the bypass passage 6. The temperature-sensitive resistor 42 is located substantially perpendicularly to the streamline of the bypass flow in the bypass passage 6. That is, the longitudinal direction of the temperature-sensitive resistor 42 is substantially perpendicular to the streamline of the bypass flow in the bypass passage 6. Referring to FIGS. 2A, 2B, the bypass flow, which is deflected substantially at 90° with respect to the mainstream, includes deflected flux having a velocity distribution. The deflected flux of the bypass flow is indicated by arrows being different in length from each other correspondingly to the velocity of streamlines. In FIG. 2B, the outer streamline indicated by the long arrow in the deflected flux is high in velocity, and the inner streamline indicated by the short arrow is low in velocity. That is, the velocity of the streamline decreases as the position of the streamline moves inward in the deflected flux of the bypass flow. The airflow before being branched from the mainstream and deflected to be the bypass flow collides against the foundation wall of the sensor body 3, which is perpendicularly opposed to the airflow, so that the airflow having large kinetic energy is deflected to increase in flow velocity to form the velocity distribution in the deflected flux of streamlines. The velocity distribution in the deflected flux produces an inertia separation effect to separate suspended particulates in the airflow. Specifically, suspended particulates, which are relatively large in mass and high in kinetic energy, cannot be quickly deflected, thereby collide to adhere onto a wall surface of the sensor body 3. Thus, suspended particulates can be easily collected by the inertia separation effect.

The flow velocity is high in the outer streamline in the deflected flux, and pressure in the outer streamline becomes low. Therefore, a velocity component Vx directed substantially along the longitudinal direction of the heating resistor 41 is added to the bypass flow. That is, the bypass flow is microscopically deflected by the velocity component Vx directed substantially along the outer periphery of the heating resistor 41, so that a deflection angle β, by which the bypass flow is deflected in the sensor body 3, becomes microscopically greater than 90°. Thus, stagnation can be reduced in the airflow. Therefore, even relatively minute suspended particulates do not adhere to the sensor body 3 and continue flowing together with the airflow along the streamline, such minute suspended particulates are apt to be restricted from adhering to the surface of the heating resistor 41 by reducing stagnation in the airflow.

Furthermore, in the present structure, the heating resistor 41 is inclined toward the downstream of the outer streamline in the deflected flux. Therefore, velocity of the outer streamline is further enhanced by the velocity component Vx, which is directed along the longitudinal direction of the heating resistor 41. Thus, stagnation can be further restricted in the airflow.

In the present structure, stagnation in the airflow can be further reduced as the heating resistor 41 is further inclined toward the downstream of the outer streamline in the deflected flux. However, as the heating resistor 41 is further inclined, a boundary layer developed around the surface of the heating resistor 41 becomes thick, and consequently heat transfer property is impaired due to heat radiation from the outer periphery of the heating resistor 41. As a result, an output characteristics including a response characteristic of the heating resistor 41 is lowered. As just described, a suitable value of the angle (inclination angle) θx of the heating resistor 41 needs to be considered and determined to reduce adhesion of suspended particulates while the output characteristic is maintained.

Figure 4:
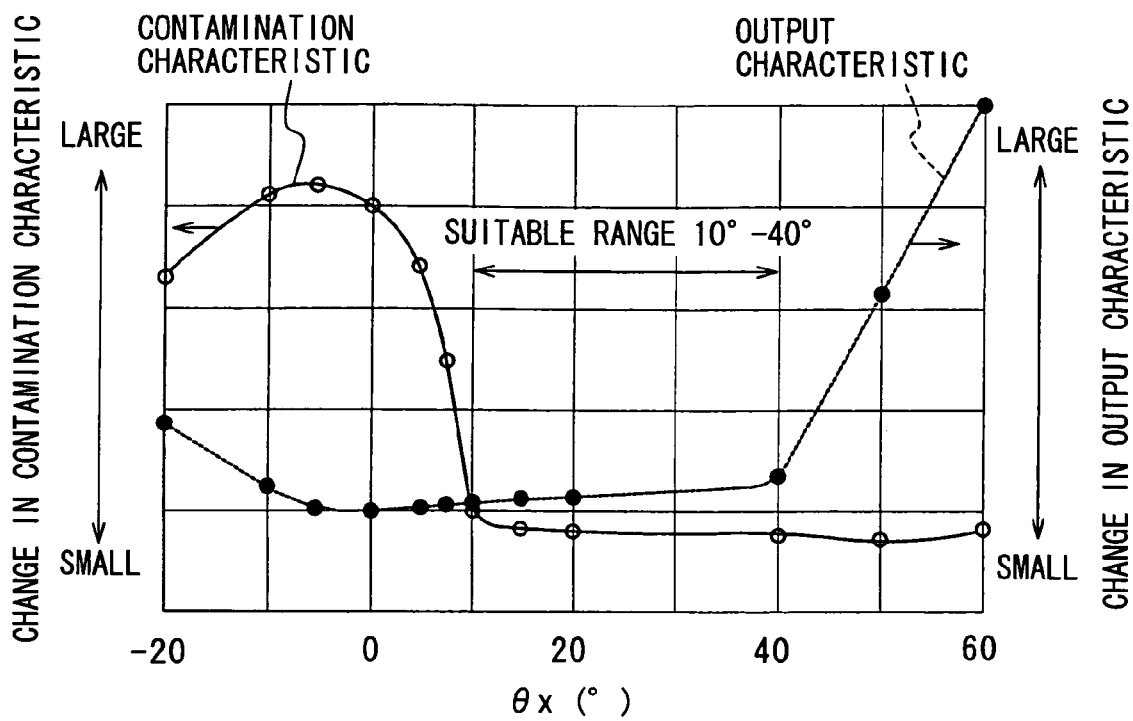
FIG. 4 is a graph showing a change in contamination characteristic and change in durability characteristic with respect to an inclination angle of a heating resistor of the sensing portion, according to the first embodiment.
Figure 5:
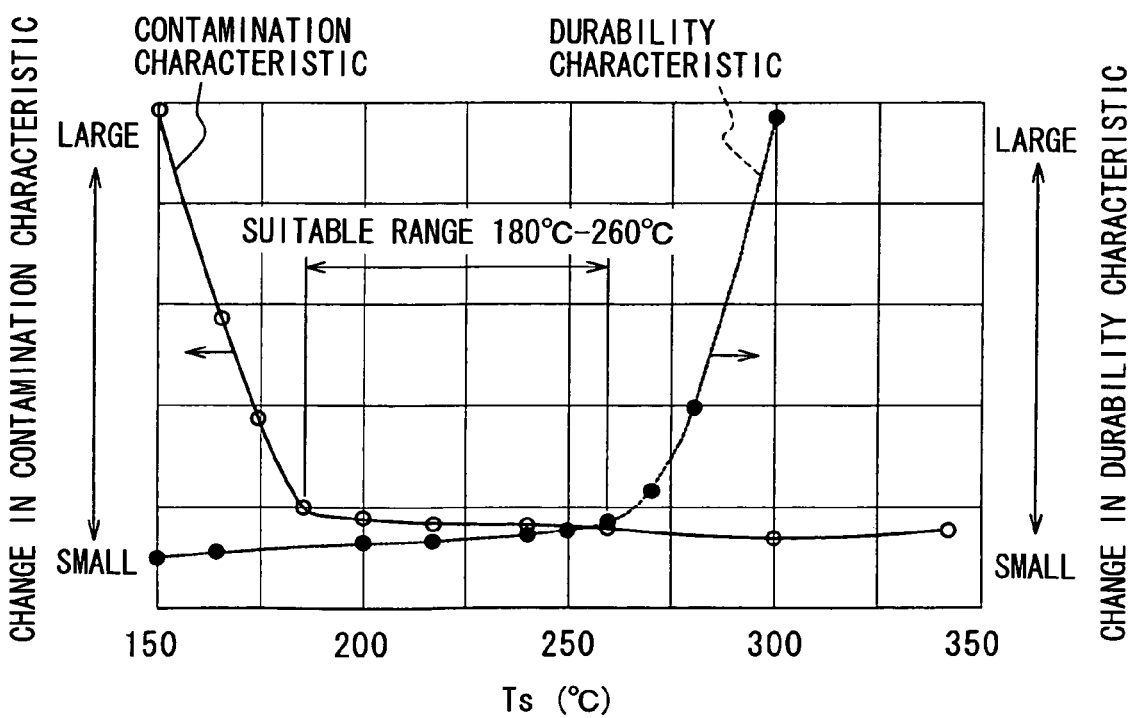
FIG. 5 is a graph showing a change in contamination characteristic and change in durability characteristic with respect to controlled temperature of the sensing portion, according to the first embodiment.

FIG. 4 shows an experimental result obtained by the inventors. According to the result shown by FIG. 4, as the inclination angle θx increases from about 0° to incline the heating resistor 41 toward the downstream in the outer streamline, the change in contamination characteristic significantly decreases. Alternatively, as the inclination angle θx decreases to incline the heating resistor 41 toward the upstream in the outer streamline, the change in contamination characteristic significantly increases. When the inclination angle θx is increased to be in a range between minus 5° and minus 10°, the change in contamination characteristic reaches a peak. Thereafter, the change in contamination characteristic decreases as the inclination angle θx decreases less than minus 10°.

The result shown in FIG. 4 indicates that contamination can be suppressed correspondingly to increase in velocity component in the longitudinal direction of the surface of the heating resistor 41 in the streamline, so that stagnation can be reduced in the airflow. Thus, the result shown in FIG. 4 indicates that the velocity component Vx in the longitudinal direction caused by the slight inclination angle θx, such as an angle greater than or equal to 10°, is significantly effective to suppress stagnation in the airflow. According to the result in FIG. 4, the change in contamination characteristic shows the peak in the range of the inclination angle θx between minus 5° and minus 10°. The reason of the peak may be conceived as follows. In the bypass flow deflected from the mainstream substantially at 90°, the outer streamline is high in flow velocity in the velocity distribution. Therefore, the bypass flow having the velocity distribution is equivalent to an apparent airflow directed at a deflection angle β greater than 90°. The airflow at the deflection angle β is substantially at the right angle with respect to the longitudinal direction of the heating resistor 41 inclined by the inclination angle θx in the range between minus 5° and minus 10°. That is, the streamlines in the airflow are substantially perpendicular to the surface of the heating resistor 41, and stagnation is apt to be caused in the airflow.

By contrast, change in output characteristic of the heating resistor 41 does not remarkably vary in a condition where the inclination angle θx is less than about 40°. Nevertheless, the output characteristic significantly increases in a condition where the inclination angle θx is increased to be greater than about 40°. Conversely, the change in output characteristic of the heating resistor 41 does not remarkably change when the inclination angle θx is reduced to about minus 10°, nevertheless, the change in output characteristic starts increasing when the inclination angle θx is decreased to be less than about minus 10°. The reason is conceived as follows. When the inclination angle θx is decreased to be less than about minus 10°, the velocity component of each streamline of the bypass flow along the longitudinal direction of the surface of the heating resistor 41 becomes greater than the velocity component perpendicular to the longitudinal direction of the heating resistor 41. In this condition, streamlines in parallel with the longitudinal direction of the surface of the heating resistor 41 become dominant, and consequently the boundary layer is developed to be thick. As a result, heat transfer characteristic of the surface of the heating resistor 41 is impaired. The present assumption may be also backed up by the relationship between the about 40° of the inclination angle θx and the deflection angle β greater than 90°. In consideration of a balance between the change in contamination characteristic and the change in output characteristic, the inclination angle θx is suitably in the range between 10° and 40°.

According to the above description, an adhesion mechanism of suspended particulates to the surface of the heating resistor 41 may become apparent. Suspended particulates contained in air flowing through the intake pipe 2 include relatively heavy and large particulates such as carbon particulates. Such relatively heavy and large particulates are applied with large inertia, thereby being apt to be separated by the inertia separation effect and adhered to the foundation wall of the sensor body 3. Minute suspended particulates may remain in the airflow and pass along the streamlines in the bypass flow after being deflected at the deflection angle β greater than 90°. In the present structure, the longitudinal direction of the heating resistor 41 is inclined by the inclination angle θx with respect to the streamlines of the airflow, so that stagnation with respect to the longitudinal direction of the heating resistor 41 is reduced in the airflow. Therefore, even though such minute particles exist in the airflow, minute particles can be restricted from adhering to the surface of the heating resistor 41. As described above, an adhesion mechanism may be analyzed in view of a kinetic theory of suspended particulates and a flow of air as viscous fluid.

Furthermore, a microscopic behavior of each minute particle contained in suspended particulates around each surface of the heating resistor 41 under a high-temperature field is considered in view of a kinetic theory. In the above analysis of the adhesion mechanism of minute particles, the boundary layer is developed by adding the longitudinal direction component, and minute particles are removed out of the boundary layer. That is, the above analysis is conducted in view of a flow of air as viscous fluid. Here, in fact, minute particles may exist in the boundary layer, and may adhere to the heating resistor 41. The heating resistor 41 is heated at about 200° C., so that the boundary layer on the surface of the heating resistor 41 forms a high-temperature field. Minute particles are exposed to the high-temperature field, and the minute particles are excited by Brownian motion caused by motion of air molecules. Consequently, the Brownian motion in minute particles is effective to restrict adhesion of minute particles.

The increase in exothermic temperature develops the temperature field in the boundary layer, thereby further activating the Brownian motion. However, the development of the temperature field simultaneously increases the thickness of the boundary layer. As a result, the heating resistor 41 is impaired in heat transfer characteristic, and consequently heat radiation from the heating resistor 41 decreases. In addition, durability of the sensing portion may be also concerned. Therefore, suitable exothermic temperature as controlled temperature Ts needs to be determined in consideration of reduction in adhesion of minute particulates and maintaining the output characteristic and a durability characteristic of the heating resistor 41. The controlled temperature Ts is temperature difference between the heating resistor 41 and the temperature-sensitive resistor 42.

FIG. 5 shows an experimental result obtained by an inventor. According to the present experimental result, the change in the contamination characteristic is small with respect to increase in controlled temperature Ts. By contrast, the change in the contamination characteristic remarkably increases with respect to decrease in controlled temperature Ts in a range where the controlled temperature Ts is substantially less than 180°. The present experimental result shows that the Brownian motion is activated and minute particulates are excited with increase in temperature, so that possibility of adhesion of minute particulates to the surface of the heating resistor 41 is reduced. In addition, minute particulates having relatively large mass can be also excited, so that the possibility of adhesion can b further reduced. Alternatively, the Brownian motion in minute particulates being less than critical mass is deactivated in a range where the controlled temperature Ts is substantially less than 180°, and consequently possibility of adhesion of the minute particulates to the surface of the heating resistor 41 increases.

On the other hand, the change in durability characteristic becomes gradually large with increase in controlled temperature Ts and becomes remarkably large in a range where the controlled temperature Ts is greater than substantially 260°. The present experimental result shows that durability of the heating resistor 41 is remarkably reduced in a high-temperature range. Here, the heating resistor 41 is made by winding a platinum wire of, for example, 0.02 mm in diameter. That is, the heating resistor 41 is made of a microscopic wire and apt to be deteriorated. Specifically, repeating of supply of a control current to maintain the heating resistor 41 at high temperature may cause fatigue in the heating resistor 41 and cracking in a protective coat of the wire of the heating resistor 41. As a result, durability of the heating resistor 41 is reduced in the high-temperature range.

In consideration of a balance between the change in contamination characteristic and the change in durability characteristic, the controlled temperature Ts is suitably in the range between 180° and 260°.

As described above, an outline of the mechanism for adhesion control by activating the Brownian motion in the minute particles are explained in a microscopic view. In short, the Brownian motion in minute particles in the boundary layer of the airflow around the heating resistor 41 is activated by increasing the controlled temperature Ts, thereby suppressing adhesion of the minute particles on the surface of the heating resistor 41. The suitable range of the controlled temperature Ts can be determined in consideration of the balance between the output characteristic and the durability characteristic.

(Modification)

Figure 6A:
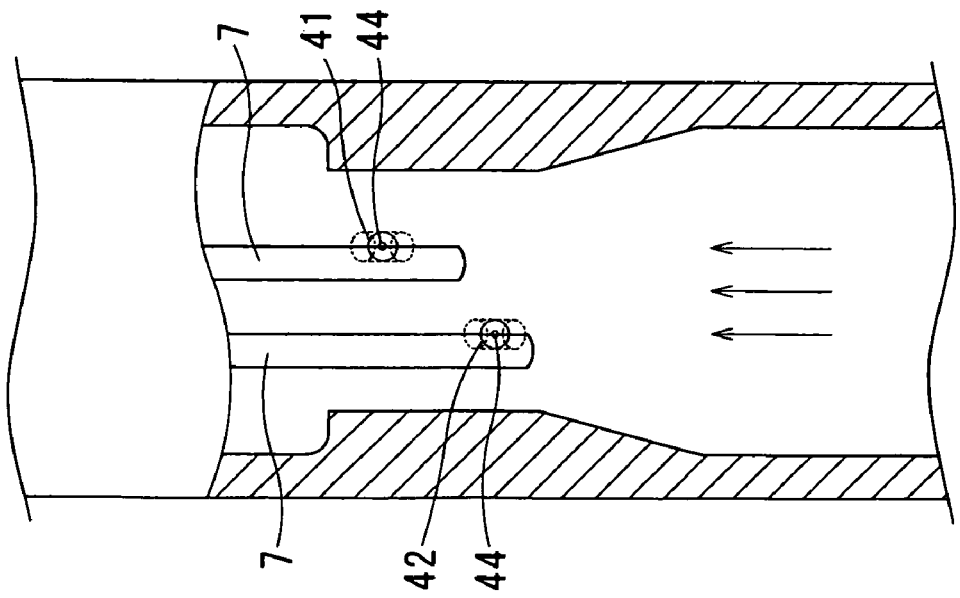
FIG. 6A is a partially sectional lateral view showing a sensing portion of an airflow measuring device according to a modification of the first embodiment.
Figure 6B:
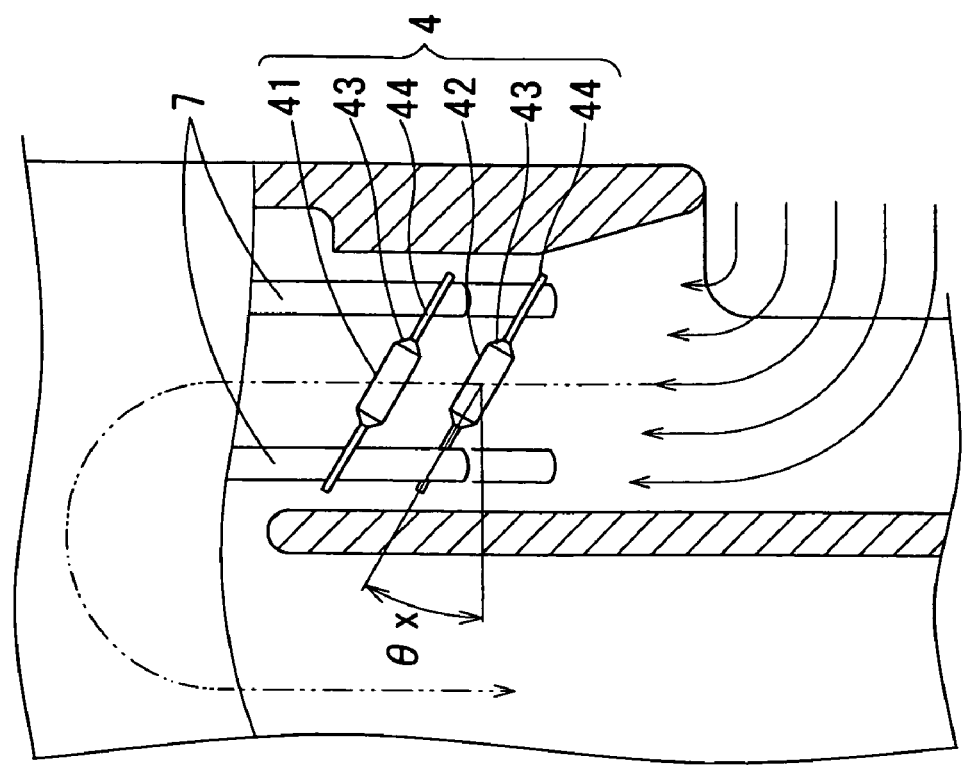
FIG. 6B is a partially sectional front view showing the sensing portion.

In the first embodiment, only the heating resistor 41 of the sensing portion 4 is inclined by the predetermined inclination angle θx toward the downstream of the outer streamline in the deflected flux and, the temperature-sensitive resistor 42 is located to be substantially perpendicular to the vertical direction as the flow direction of the bypass flow. The structure of the temperature-sensitive resistor 42 is not limited to that in the first embodiment. As shown in FIGS. 6A, 6B, the temperature-sensitive resistor 42 may be inclined by a predetermined inclination angle θx toward the downstream of the outer streamline of the deflected flux, similarly to the heating resistor 41. In the present structure, a velocity component along the longitudinal direction of the temperature-sensitive resistor 42 is added. Consequently, a boundary layer is developed on the surface of the temperature-sensitive resistor 42, so that stagnation in the airflow can be reduced. Thus, adhesion of suspended particulates can be suppressed, similarly to the heating resistor 41. In the present structure, the inclination angle of the temperature-sensitive resistor 42 need not be the same as the inclination angle of the heating resistor 41. It suffices that the inclination angle of the temperature-sensitive resistor 42 is substantially comparable to that of the heating resistor 41.

Originally, the temperature-sensitive resistor 42 is maintained at operating temperature, which is comparable to ambient temperature. Therefore, in the present structure, reduction in adhesion of suspended particulates to the temperature-sensitive resistor 42 is not necessarily effective compared with the heating resistor 41 at high temperature. In the present structure, even though, accuracy of temperature detection can be maintained over a long period, so that change in the output characteristic can be maintained at low level.

Operation of First Embodiment

Next, an operation of the airflow measuring device 1 is described.

The engine is started, whereby mainstream of air is generated in the intake pipe 2. A part of the mainstream as the bypass flow is deflected at substantially 90° to pass through the bypass passage 6 of the sensor body 3. Suspended particulates contained in air flowing through the intake pipe 2 include relatively heavy and large particulates such as carbon particulates. Such relatively heavy and large particulates are applied with large inertia, thereby being apt to be separated by the inertia separation effect and adhered to the foundation wall of the sensor body 3.

The mainstream is partially deflected at substantially 90° to form the bypass flow having the deflected flux therein defining a velocity distribution between the outer and inner streamlines. The streamlines defining the velocity distribution form the velocity component in the longitudinal direction of the heating resistor 41, which is inclined toward the downstream of the outer streamline of the deflected flux, to develop the boundary layer and reduce stagnation in the airflow, whereby adhesion of suspended particulates is suppressed. As the surface of the heating resistor 41 dissipates heat, the heating resistor 41 decreases in temperature, whereby the heating resistor 41 changes in resistance. The electric current supplied to the heating resistor 41 changes in order to maintain the temperature difference at constant relative to the air temperature detected using temperature-sensitive resistor 42. Thus, the quantity of air, which is proportional to the electric current, is measured.

As the engine speed increases, the flow velocity of the mainstream increases, so that the velocity of the bypass flow increases. As velocity of the bypass flow increases in the sensing portion 4 provided to the bypass passage 6, heat radiated from the heating resistor 41 becomes large. In this condition, electricity supplied to the heating resistor 41 is increased to constantly maintain difference between temperature of the heating resistor 41 and air temperature detected using the temperature-sensitive resistor 42. On the contrary, as the velocity of the bypass flow decreases, heat dissipated from the heating resistor 41 becomes small, so that electricity supplied to the heating resistor 41 is decreased.

The circuit portion 5 outputs an electric signal such as voltage signal to the ECU correspondingly to the electricity supplied to the heating resistor 41. The ECU measures the intake airflow in accordance with the electric signal.

Effect of Embodiment

In the present embodiment, the airflow in the bypass passage is deflected at 90° with respect to the airflow in the main passage and bent perpendicularly to the direction, which is perpendicular to the airflow in the main passage. The sensing portion 4 includes the heating resistor 41 and the temperature-sensitive resistor 42, which are connected and supported by the pair of support members 7, which are erected in the bypass passage 6, via the pair of lead members 44. The heating resistor 41 and the temperature-sensitive resistor 42 are energized via the support members 7. The energization is controlled on the basis of heat radiation of the heating resistor 41 such that the temperature difference between the heating resistor 41 and the temperature-sensitive resistor 42 is maintained at the predetermined controlled temperature Ts. The sensing portion 4 for measuring the airflow in the bypass passage 6 is inclined by the predetermined inclination angle θx with respect to the direction, which is perpendicular to the airflow in the bypass passage 6. The sensing portion 4 is inclined toward the downstream of the outer streamline of the deflected flux of the airflow in the bypass passage 6.

Suspended particulates contained in air flowing through the intake pipe 2 include relatively heavy and large particulates such as carbon particulates. Such relatively heavy and large particulates are applied with large inertia, thereby being apt to be separated by the inertia separation effect and adhered to the foundation wall of the sensor body 3.

Part of relatively light and small airborne particles may not collected by the inertia separation effect, and the airborne particles may flow along the bypass flow deflected at substantially 90° from the mainstream. In this case, the airborne particles enter the sensing portion 4 along the flux having the velocity distribution between the outer streamline and the inner streamline therein. In the present embodiment, the sensing portion 4 is inclined toward the downstream of the outer streamline of the deflected flux, and the velocity component Vx is added along the longitudinal direction of the heating resistor to develop the boundary layer on the surface of the heating resistor, thereby reducing stagnation in airflow. Thus, adhesion of suspended particulates can be suppressed. In addition, adhesion of minute particles can be also reduced by enhancing Brownian motion in the boundary layer.

More specifically, adhesion of suspended particulates can be significantly suppressed while maintaining accuracy measurement by inclining the heating resistor 41 toward the downstream of the outer streamline of the deflected flux at the inclination angle θx in the range between 10° and 40° with respect to the vertical direction.

Furthermore, adhesion of the airborne particles particularly in the boundary layer can be significantly suppressed and the durability characteristic of the sensing portion 4 can be also maintained by determining the controlled temperature Ts, which is the temperature difference between the heating resistor 41 and the temperature-sensitive resistor 42, in the range between 180° C. and 260° C.

Further, in the present structure, each support member 7, which supports the heating resistor 41 and the temperature-sensitive resistor 42 of the sensing portion 4, is erected substantially along the streamline of the airflow in the bypass passage 6. Therefore, stagnation on the surface can be suppressed with respect to the longitudinal direction, so that adhesion of suspended particulates can be suppressed.

Second Embodiment

Figure 7B:
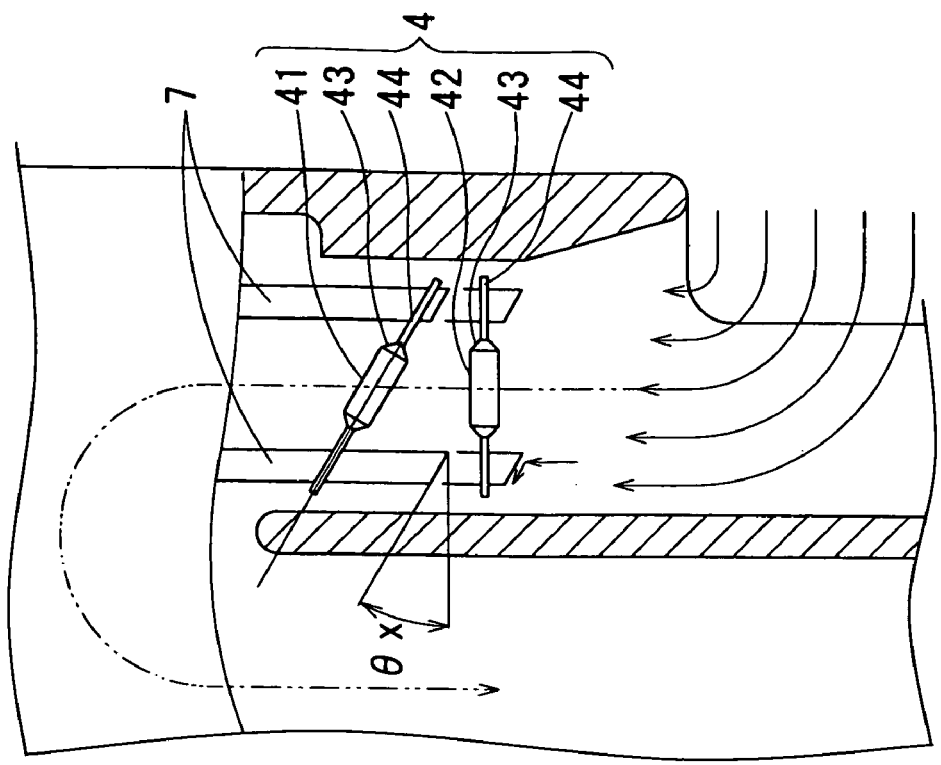
FIG. 7B is a partially sectional front view showing the sensing portion.
Figure 7A:
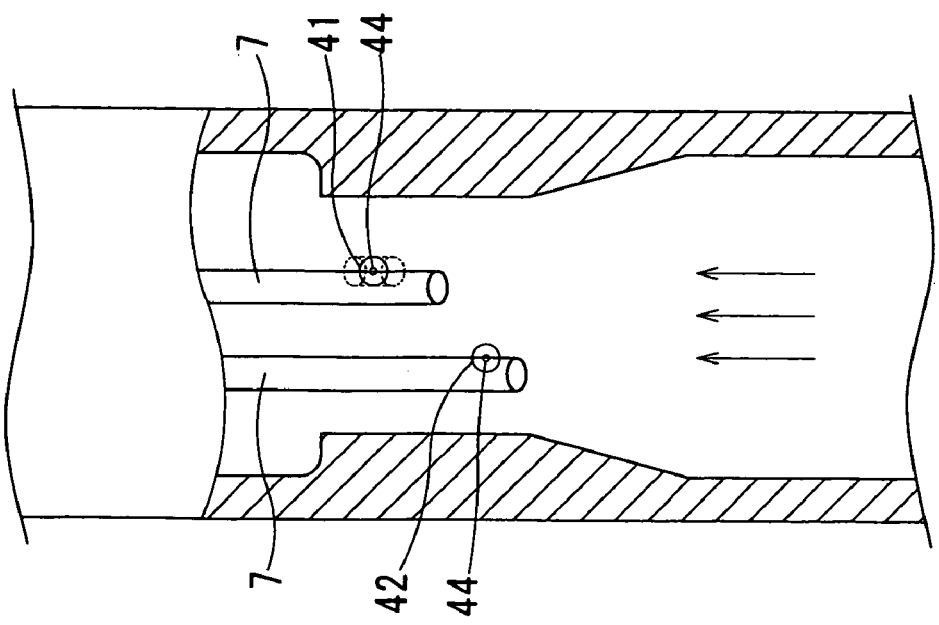
FIG. 7A is a partially sectional lateral view showing a sensing portion of an airflow measuring device according to a second embodiment.

In the present embodiment, as shown in FIGS. 7A, 7B, each support member 7 has an end surface with respect to the longitudinal direction thereof, and the end surface is inclined at a predetermined inclination angle with respect to the streamline of the bypass flow. It suffices that at least one of the support member 7 has the inclined end surface as a slope. In the present structure, the end surface is capable of developing a boundary layer thereon to reduce stagnation, thereby suppressing adhesion of suspended particulates. Therefore, the boundary layer developed along each end surface of the support member 7 is also effective to reduce adhesion of suspended particulates in the connecting portion, in which the support member 7 is connected with the lead member 44 by, for example, welding. Further, adhesion of suspended particulates can be reduced on the surface along the longitudinal direction of each support member 7, similarly to the first embodiment.

Here, the predetermined inclination angle of the inclined end surface on the end surface of the support member 7 may be the same as the predetermined inclination angle θx of the sensing portion 4. The inclined end surface on the end surface of the support member 7 may be directed toward the connecting portion between the support member 7 and the lead member 44. The support member 7 may be circular in cross section to have a substantially conical end. The support member 7 may be rectangular in cross section to have a substantially square pyramid end. It suffices that the end surface of the support member 7, which is erected along the streamline of the bypass flow, has the inclined end surface, to which the streamline of the bypass flow collides whereby stagnation in the bypass flow is reduced. The angle and direction may be arbitrary determined according to the shape and the size of the end portion of the support member 7.

As shown in FIGS. 8A, 8B, a protection member 8 as a contamination restriction member may be provided upstream of the streamline of the airflow with respect to the longitudinal direction of the pair of the support members 7 erected in the bypass passage 6. In this case, the protection member 8 is configured to at least partially cover a projected plane of the pair of the support members 7 with respect to a longitudinal direction thereof. The protection member 8 may be circular in cross section as shown in FIG. 8A. Alternatively, as shown in FIG. 8B, at least two protection members 8 may be provided. It suffices that each protection member 8 guards the sensing portion 4 and the support members 7, and the protection member 8 may be in any shapes such as a square column shape or a plate shape.

In the present structure, the end surface of each support member 7, the connecting portion between each support member 7 and each lead member 44, and each lead member 44 can be partially or entirely protected from adhesion of suspended particulates.

The above structures of the embodiments can be combined as appropriate. For example, the structure shown in FIGS. 7A, 7B may be combined with the structure shown in FIGS. 8A, 8B. The structure shown in FIGS. 6A, 6B may be combined with the structures shown in FIGS. 7A, 7B, 8A, 8B.

Various modifications and alternations may be diversely made to the above embodiments without departing from the spirit of the present invention.

What is claimed is:

1. An airflow measuring device provided to a main passage, the airflow measuring device comprising:
   a bypass passage defined in part by a bypass wall surface disposed transverse to a direction of airflow in the main passage to perpendicularly intercept and deflect a part of an airflow in the main passage into said bypass passage as bypass airflow; and
   a sensing portion provided in the bypass passage,
   wherein the sensing portion includes a heating resistor configured to be energized and radiate heat to said bypass airflow, the sensing portion being configured to measure bypass airflow in the bypass passage based on the heat radiation,
   the sensing portion further includes a pair of support members erected in the bypass passage to support the heating resistor,
   a longitudinal axis of the heating resistor being inclined at a first inclination angle (θx) with respect to a direction, which is perpendicular to a flow direction of bypass airflow in the bypass passage, and so that the heating resistor is inclined a downstream direction with respect to the bypass airflow in the bypass passage with a downstream end of the heating resistor being at a side of the bypass wall surface, causing a velocity component Vx along the heating resistor to reduce stagnation in airflow and influence a velocity distribution of the airflow through the bypass passage, the pair of support members extend in the direction of airflow in the bypass passage.

2. The airflow measuring device according to claim 1, wherein the inclination angle is in a range of 10° to 40°.

3. The airflow measuring device according to claim 1,
wherein the sensing portion further includes a temperature-sensitive resistor for measuring temperature of the airflow in the bypass passage, and the heating resistor and the temperature-sensitive resistor therebetween have a temperature difference in a range of 180° C. to 260° C.

4. The airflow measuring device according to claim 1,
wherein at least one of the pair of the support members extends in the bypass passage and has an end surface defining a slope, and the slope is inclined at an inclination angle with respect to a direction, which is perpendicular to a flow direction of air in the bypass passage.

5. The airflow measuring device according to claim 1, further comprising:

at least one protection member provided upstream of the pair of the support members in the bypass passage, wherein the pair of support members extends in the bypass passage and has a projected plane with respect to a longitudinal direction of the pair of support members, and the protection member is configured to at least partially cover the projected plane.

6. The airflow measuring device according to claim 5, wherein the at least one protection member is substantially in one of a circular column shape, a rectangular column shape, and a plate shape.

7. The airflow measuring device according to claim 5, wherein the at least one protection member is provided to each of the pair of support members.

8. The airflow measuring device according to claim 1,
wherein the sensing portion further includes a temperature-sensitive resistor for measuring temperature of the airflow in the bypass passage, the temperature-sensitive resistor is inclined at a second inclination angle with respect to the direction, which is perpendicular to the flow direction of air in the bypass passage, and the temperature-sensitive resistor is inclined toward downstream at the outer streamline of the airflow in the bypass passage.

9. The airflow measuring device according to claim 8, wherein the first inclination angle is substantially the same as the second inclination angle.

10. The airflow measuring device according to claim 1, wherein the longitudinal axis of the heating resistor is disposed in a plane generally parallel to airflow in the main passage and parallel to airflow in the bypass passage and an upstream end of the heating resistor with respect to the direction of bypass airflow is disposed farther from the bypass wall surface than the downstream end of the heating resistor.

11. The airflow measuring device according to claim 1, wherein the heating resistor is located at a downstream of the bypass wall surface.

12. An airflow measuring device provided to a main passage, the airflow measuring device comprising:

a bypass passage having a bypass wall surface opposed to airflow in the main passage to perpendicularly deflect part of air from the main passage to cause bypass flow therethrough, the bypass flow having a velocity distribution in which a streamline at a side of the bypass wall surface is higher than a streamline at an opposite side of the bypass passage from the bypass wall surface; and a sensing portion provided in the bypass passage, the sensing portion including a heating resistor configured to radiate heat to deflected airflow when energized for detection of the bypass flow based on heat radiation, wherein a longitudinal direction of the heating resistor is inclined at a first inclination angle ($\theta x$) with respect to a direction perpendicular to the bypass flow, toward downstream of the bypass flow at the side of the bypass wall surface to cause velocity component (Vx) along the heating resistor to be inclined toward downstream of the bypass flow at the side of the bypass wall surface.

13. The airflow measuring device according to claim 12, wherein the longitudinal direction of the heating resistor is disposed in a plane generally parallel to airflow in the main passage and parallel to airflow in the bypass passage and an upstream end of the heating resistor with respect to the direction of bypass airflow is disposed farther from the bypass wall surface than the downstream end of the heating resistor.

14. The airflow measuring device according to claim 12, wherein the heating resistor is located at a downstream of the bypass wall surface.

* * * * *